Jan. 15, 1946. W. L. WUEHR 2,393,084
INTERNAL-COMBUSTION ENGINE
Filed Aug. 25, 1944 4 Sheets-Sheet 3
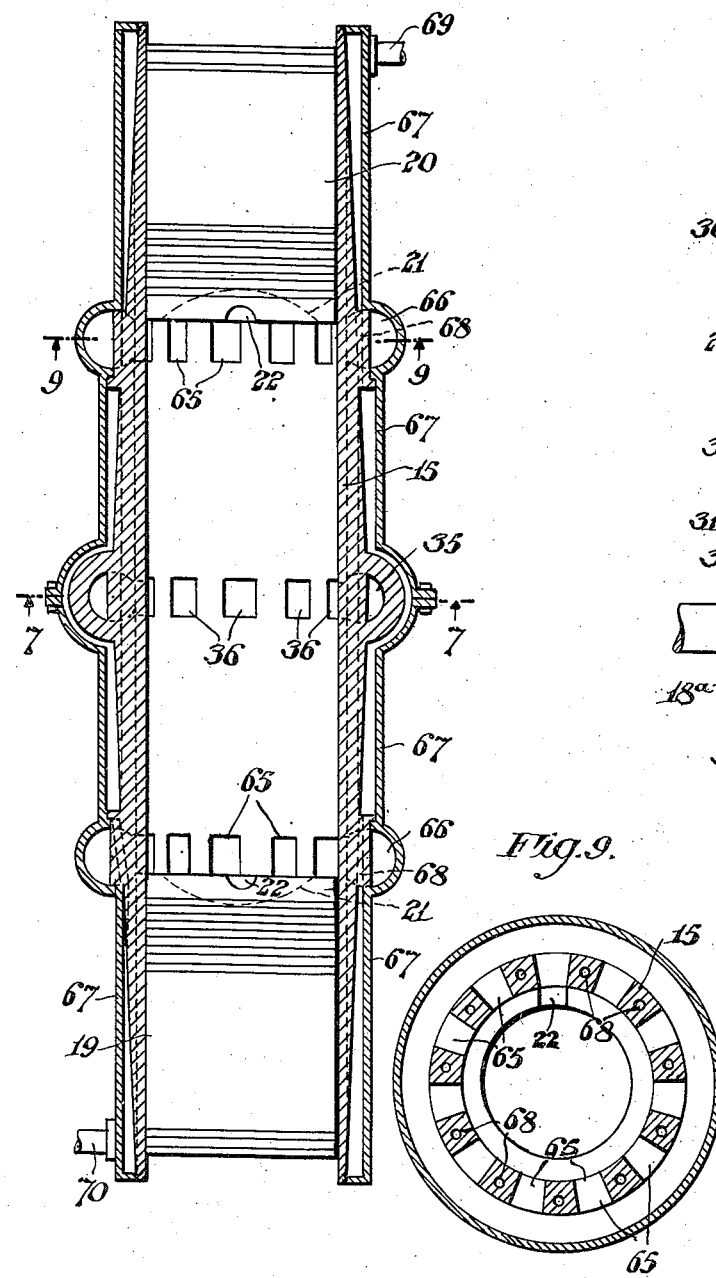
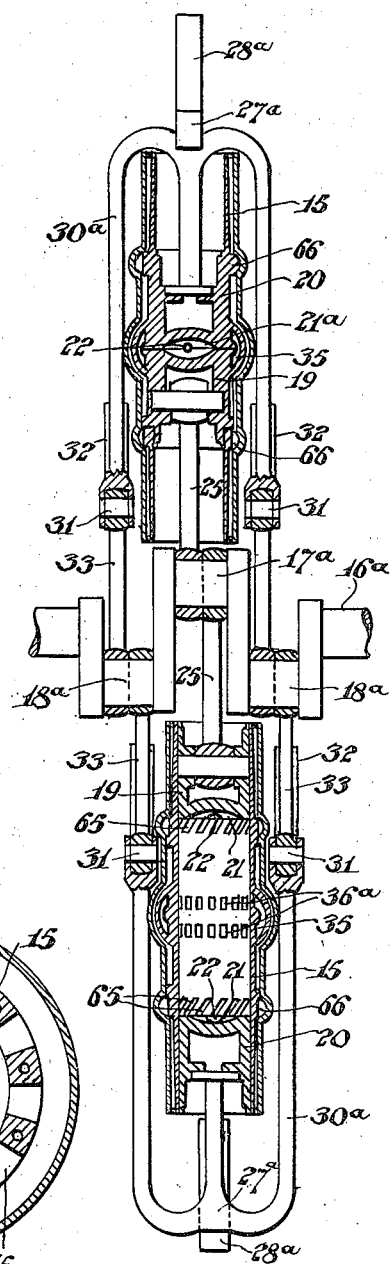
Inventor
William L. Wuehr,
By Z. T. Wobensmith 2nd
Attorney.

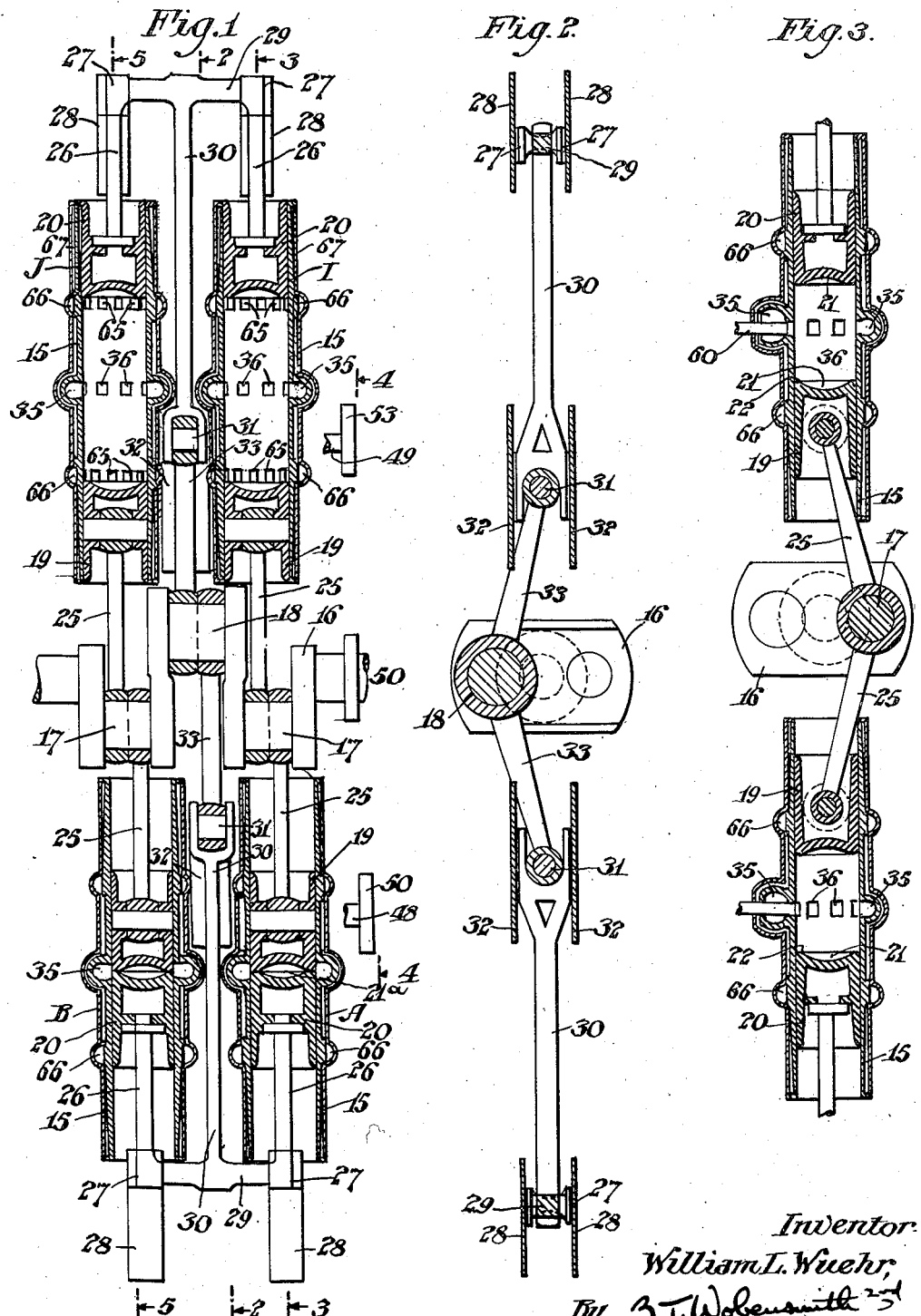

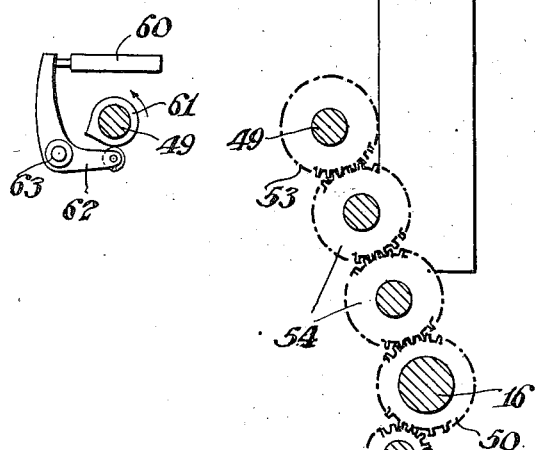

INVENTOR.
William L. Wuehr,
BY
ATTORNEY.

Patented Jan. 15, 1946

2,393,084

UNITED STATES PATENT OFFICE 2,393,084

INTERNAL-COMBUSTION ENGINE

William L. Wuehr, Port Arthur, Tex.

Application August 25, 1944, Serial No. 551,079

15 Claims. (Cl. 123—51)

This invention relates to internal combustion engines, and more particularly to compression ignition engines.

It is an object of the present invention to provide a compression ignition engine having an improved arrangement of cylinders, pistons and crankshaft.

It is a further object of the present invention to provide an improved compression ignition engine in which the forces to be transferred to the crankshaft are distributed in a better manner than heretofore, whereby the stresses are reduced.

It is a further object of the present invention to provide a compression ignition engine which will be relatively flat and which will be suitable for use as a power plant in airplanes, armored tanks, trucks, trains, boats, and, in multiple, for ship propulsion.

It is a further object of the invention to provide an engine of the character aforesaid having improved scavenging and fuel introduction.

It is a further object of the present invention to provide an improved engine of the type aforesaid in which the necessary operations in connection with the combustion of the fuel and the other stages of the cycle may be effectively carried out at high speed.

It is a further object of the present invention to provide an engine of the type aforesaid in which better control of the combustion is obtained with the air pressure capable of variation with changes of load.

It is a further object of the present invention to provide an engine of the type aforesaid in which higher mean effective pressures are obtainable than have heretofore been commonly employed.

It is a further object of the present invention to provide a compression ignition engine employing multiple cylinders with opposed pistons therein constructed and arranged to provide high power output in a relatively restricted space.

It is a further object of the present invention to provide a compression ignition engine in which access to the operating parts may be readily had for inspection, repair, and replacement.

It is a further object of the present invention to provide a compression ignition engine in which the various steps of the operating cycle are interrelated in such manner as to provide efficient high speed operation with low fuel consumption.

Other objects of the invention will be apparent from the annexed specification and claims.

The nature and characteristic features of the invention will be more readily understood from the following description, taken in connection with the accompanying drawings forming part hereof, in which:

Figure 1 is a horizontal sectional view through a portion of an engine in accordance with the present invention;

Fig. 2 is a vertical sectional view taken approximately on the line 2—2 of Fig. 1, but with the crankshaft moved back 90° from the position shown in Fig. 1;

Fig. 3 is a fragmentary vertical sectional view taken approximately on the line 3—3 of Fig. 1, but with the crankshaft moved back 90° from the position shown in Fig. 1;

Fig. 4 is a transverse vertical sectional view taken approximately on the line 4—4 of Fig. 1;

Fig. 5 is a transverse vertical sectional view taken approximately on the line 5—5 of Fig. 1;

Fig. 6 is an enlarged horizontal sectional view of one of the cylinders of the engine shown in Fig. 1;

Fig. 7 is a vertical sectional view taken approximately on the line 7—7 of Fig. 6;

Fig. 8 is a fragmentary vertical sectional view taken approximately on the line 8—8 of Fig. 7;

Fig. 9 is a fragmentary vertical sectional view taken approximately on the line 9—9 of Fig. 6;

Fig. 11 is a horizontal central sectional view showing a modified form of an engine in accordance with the present invention.

It should, of course, be understood that the description and drawings herein are illustrative merely, and that various modifications and changes may be made in the structure disclosed without departing from the spirit of the invention.

Referring more particularly to the drawings in the embodiment of the invention illustrated in Figs. 1 to 10, inclusive, there is illustrated one form of engine of the opposed piston type for two cycle operation.

The engine preferably includes a plurality of cylinders 15 arranged as hereinafter explained, and, as illustrated in the specific embodiment in Fig. 1, a unit group of four cylinders 15 is provided. As indicated further in Fig. 10 four of these unit groups are connected to a crankshaft 16 with the crankpins 17 and 18 in planes at 90° intervals, are preferably employed to provide a more uniform torque. It will thus be seen that sixteen cylinders are provided, and, as hereinafter explained, have thirty-two pistons connected to twelve crank pins.

Figure 10:
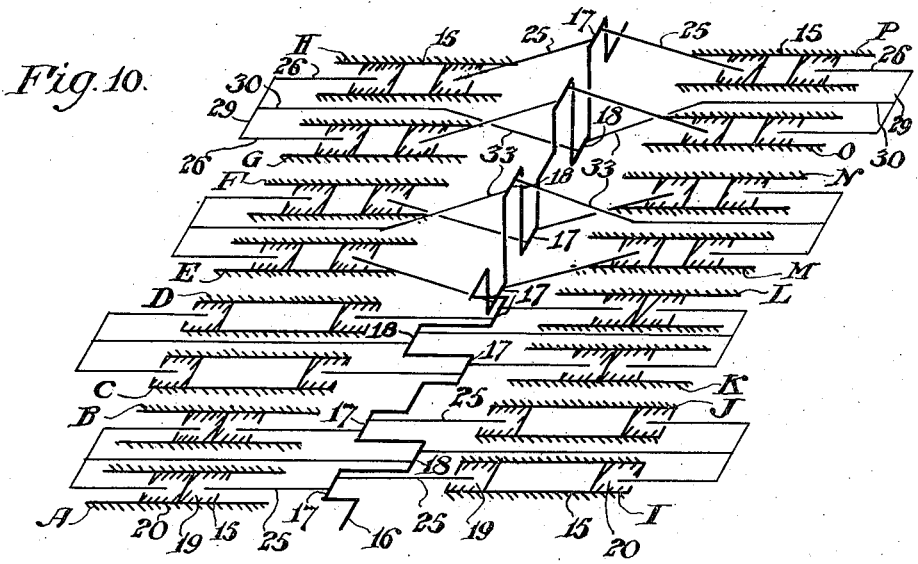
Fig. 10 is a diagrammatic view showing the arrangement of the crankshaft and pistons in an engine in accordance with Fig. 1.

For purposes of explanation the cylinders will be designated by letters and as seen in Figs. 1 and 10, the cylinders A, B, C, D, E, F, G, H, I, J, K, L, M, N, O, and P are provided. The cylinders 15 of the respectively unit groups are (1) A, B, I and J; (2) C, D, K and L; (3) E, F, M and N; and (4) G, H, O and P.

The cylinders 15 are arranged in two rows, e. g. A to H, inclusive and I to P, inclusive, and the cylinders 15 in each row preferably have their longitudinal axes parallel and coplanar. The cylinders 15 are disposed with the parallel axes in one row preferably offset with respect to the parallel axes of the cylinders in the other row a distance sufficient to permit driving connection to the crankshaft 16 as hereinafter pointed out.

Each cylinder 15 is provided with a pair of opposed pistons consisting of an inner piston 19 and an outer piston 20 movable towards and away from each other for compression and expansion. Each piston 19 and 20 at the head end thereof is provided with a central dished portion 21 and with a hollow semi-cylindrical port or passageway 22 in communication with the interior space or chamber 21a provided by the dished heads 21 when the same are together at the central part of the cylinder 15.

A single crank shaft 16 is employed and is preferably provided with a three throw arrangement for each unit group of cylinders 15 and pistons 19 and 20, with two crank pins 17 in alinement and one crank pin 18 spaced 180° from the pins 17 for purposes to be explained. The crank pins 17 and 18 for the respective groups may be suitably spaced at 90° intervals as indicated in Fig. 10 for equalization of the torque delivered to the crank shaft 16. The inner pistons 19 for the cylinders A and I are connected to one crank pin 17 and the inner pistons 19 for the next cylinders B and J are connected to another crank pin 17. The inner pistons 19 for the cylinder A and for the cylinder I opposite thereto are connected to the same crank pin 17 by separate connecting rods 25 and the inner pistons 19 for the opposite cylinders B and J are connected to the next crank pin 17 by separate connecting rods 25.

The outer pistons 20 for the cylinders A and I preferably are connected through connecting rods 26 to slippers 27 carried in guides 28. The rods 26 of adjacent pairs of pistons 20 are connected by cross arms 29 from which side rods 30 are connected to cross head pins 31 carried in cross head guides 32. The pins 31 are connected through connecting rods 33 to the crank pin 18, the outer pistons 20 of a unit group of cylinders thus being connected to one of the crank pins 18.

The manner of connection of the pistons to the crankshaft and the interrelationship of the piston action is illustrated diagrammatically in Fig. 10. The inner pistons 19 of cylinders A and B, and I and K are connected to crank pins 17 disposed in a plane arbitrarily selected as a horizontal plane at a predetermined initial or zero location and the outer piston 20 of these same cylinders are connected to a crankpin 18 disposed in the same horizontal plane but 180° therefrom in the path of the crankpins. The inner pistons 19 of the cylinders C and D, and K and L are preferably connected to crankpins 17 disposed in the same horizontal plane at the 180° location with the outer pistons 20 of these same cylinders connected to a crankpin 18 in the same horizontal plane but at the 0° location. The inner pistons 19 of the cylinders E and F, and M and N, are preferably connected to crankpins 17 disposed in a vertical plane and below the horizontal plane at a location which may be referred to as 90° while the outer pistons 20 of these same cylinders have their crankpins 17 disposed in the same vertical plane but at a 270° location. The inner pistons 19 of the cylinders G and H, and O and P, are preferably connected to crankpins 17 disposed in a vertical plane at the 270° location with the outer pistons 20 of these same cylinders having their crankpins 18 disposed in the same vertical plane but at the 90° location.

It will be noted that in each instance the inner pistons 19 of each unit group and the outer pistons 20 of each unit group function in a predetermined relationship and further that a predetermined relationship exists among the various groups. For example, when the pistons 19 and 20 in the cylinders A and B are in firing position, at the center of these cylinders, the pistons 19 and 20 in the cylinders K and L are simultaneously in firing position, and the pistons 19 and 20 in the cylinders I, J, C and D are in exhaust and scavenging position.

The preferred firing order may be set forth as ABKL, EFOP, CDIJ, GHMN, and then KLAB, OPEF, IJCD and MNGH, the four cylinders in each instance firing simultaneously.

At the center of each cylinder 15 a chamber 35 is provided which surrounds or encircles the cylinder 15 and is in communication with the interior of the cylinder through the inlet ports 36. The chambers 35 are provided with valves 38 which function as a combustion air inlet and scavenging air inlet valves, suitable mechanism being provided for controlling the opening of the valves 38 in the proper timed relationship. Air supply chambers 39 are provided in communication with the inlet sides of the valves 38 and air supply ducts 40 are provided in communication with the chambers 39 for supplying air under pressure, preferably at about one and one-half atmospheres absolute, from any suitable source (not shown).

The inlet valves 38 for each cylinder 15 are preferably moved to closed position by means of springs 41 and moved to open position by means of rocker arms 42 which engage valve stems 43. The rocker arms 42 are carried on suitable rocker shafts 44. The rocker arms 42 are actuated in timed relationship by air valve cams 45, each of which is provided with a land 46 for moving the valves 38 to open position.

Cam shafts 48 and 49 are provided for each row of cylinders 15. The cam shaft 48 is preferably operated from the crank shaft 16 through a gear train which includes a driving gear 50 directly keyed to the crank shaft 16 and rotating therewith, a driven gear 51 carried by the cam shaft 48 for driving the same and intermediate gears 52 for transmitting the desired timed movement. The cam shaft 49 is preferably operated from the crank shaft 16 through a gear train which includes the driving gear 50, a driven gear 53 carried by the cam shaft 49 for driving the same, and intermediate gears 54 for transmitting the desired timed movement.

A fuel supply valve 60 of any desired type is also provided for delivering fuel in timed relationship into the interior of the cylinders 15 and through the port or passageway 22 into the space 21 between the pistons 19 and 20. The cam shafts 48 and 49 preferably carry suitably timed fuel delivery cams 61 for actuating rocker arms 62 carried on suitable rocker shafts 63. The rocker arms 62 serve to actuate the fuel valves 60.

While any desired type of fuel valve 60 may be employed, capable of delivering the desired charge in the available time interval, a suitable fuel valve and operating mechanism therefor is shown in my copending application for Letters Patent filed September 19, 1944, Serial No. 554,743.

The exhaust ports 65 are located in the cylinders 15 at the outer ends of the strokes of the pistons 19 and 20 and are in communication with exhaust chambers 66 which surround or encircle the cylinders 15.

The cylinders 15 are preferably provided with cooling jackets 67 spaced from the cylinder walls and with longitudinal openings 68 in the cylinders 15 for transfer of cooling fluid from one end of the cylinder to the other. Fluid may be introduced through a pipe 69 at one end and discharged through a pipe 70 at the other end of each cylinder 15.

The mode of operation of the engine illustrated in Figs. 1 to 10 will now be pointed out. While any desired firing order may be employed the firing order heretofore set forth is preferred. For purposes of explanation the action within a single cylinder 15 will be explained, it being understood that the operation of the other cylinders 15 is similar but in the proper timed relationship as herein indicated. Air from any suitable source of air under pressure, such for example as blowers (not shown), is delivered through the ducts 40 to the air supply passages 39 at the inlet side of the air control valves 38.

Commencing with the pistons 19 and 20 at the outer ends of their strokes and with the air inlet valves 38 open, as the pistons 19 and 20 move inwardly the exhaust ports 65 at each end of the cylinders 15 are shut off by the pistons 19 and 20. The cams 45 have theretofore opened the air valves 38 so that air is introduced into the cylinder 15 through the inlet ports 36. The inlet ports 36 are preferably arranged in such manner as to give the incoming air a rotary motion within the interior of the cylinders 15. The cams 45 move to permit closing of the inlet valves 38 as the pistons 19 and 20 continue their inward movement. The air trapped in the cylinders 15 between the pistons 19 and 20 and in the chamber 35 is compressed by the further inward movement of the pistons 19 and 20. As the pistons 19 and 20 approach each other air under pressure is retained in the interior space 21a and a portion of the air is forced into and retained in the chamber 35, the pistons 19 and 20 as they approach the center of the cylinders 15 cutting off the inlet ports 36. The air between the pistons 19 and 20 and in the space 21a at the final stage of compression is ready to receive the fuel which is introduced by and through the fuel inlet valves 60 in any desired manner through the passageway 22, the fuel inlet valves 60 being timed in their operation by means of the cams 61. The burning of the fuel in the air in the interior space 21a provides a force tending to separate the pistons 19 and 20. As the pistons 19 and 20 separate the air from the chamber 35 enters through the ports 36 with a rotary and turbulent motion and aids in the combustion.

The expansion of the gases upon combustion provides the force for driving the pistons 19 and 20 in the usual manner. As the pistons 19 and 20 separate and approach the outer ends of their strokes, the exhaust ports 65 are uncovered permitting the discharge of the exhaust combustion products. As the exhaust ports 65 are opened by the movement of the pistons 19 and 20 the air inlet valve 38 is also opened to provide scavenging of the cylinders 15. The air for scavenging enters through the valve 38, the chamber 35 and the ports 36 and drives the burned gases through the exhaust ports 65 while the pistons 19 and 20 are at the outer ends of their strokes. The pistons 19 and 20 then move inwardly as before and the operation is repeated.

The pistons 19 and 20 in the various cylinders are simultaneously operating at respectively different portions of their strokes as heretofore indicated.

Figure 12:
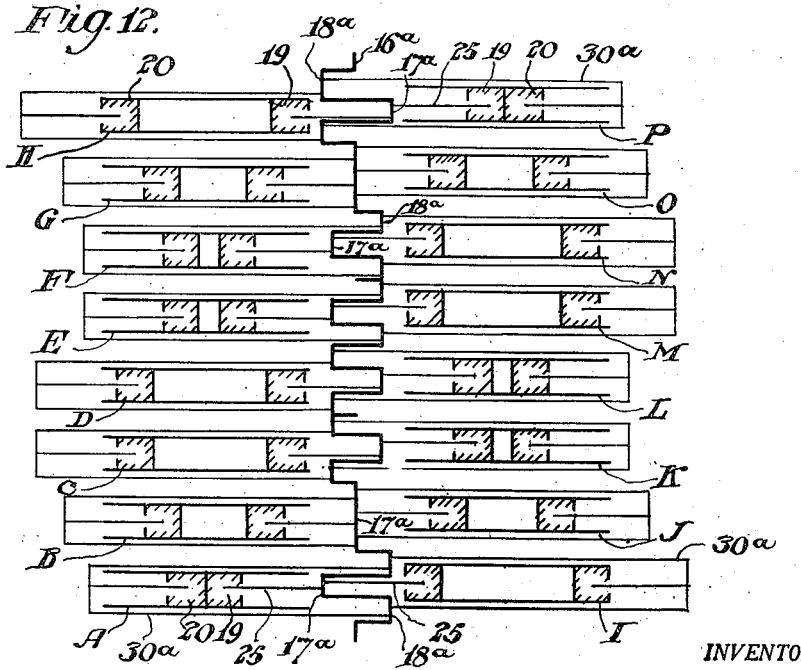
Fig. 12 is a diagrammatic view showing the arrangement of the crankshaft and pistons in an engine in accordance with Fig. 11.

In the form of the invention illustrated in Figs. 11 and 12 a unit of two cylinders 15 is provided forming part of an engine having eight of these unit groups connected to a crankshaft 16a at suitable intervals for torque transmission. As indicated in Fig. 12 the crankpins are in planes at 45° intervals to provide uniform torque. In this form of the invention sixteen cylinders are provided and have thirty-two pistons connected to twenty-four crankpins.

The cylinders A to H, inclusive, are arranged in one row and the cylinders I to P, inclusive, in another row with the cylinders in each row having their longitudinal axes parallel and coplanar. The cylinders 15 are disposed with the parallel axes in one row preferably offset with respect to the parallel axes of the cylinders 15 in the other row a distance sufficient to permit driving connection to the crankshaft.

Each cylinder 15 is provided with a pair of opposed pistons, as in the other form of the invention, consisting of an inner piston 19 and an outer piston 20 movable toward and away from each other for compression and expansion. The pistons 19 and 20 at the heads thereof are preferably of the type heretofore pointed out, with central dished portions 21 and with semi-cylindrical passageways 22 and a central space 21a when together.

A single crankshaft 16a is employed and is preferably provided with a three throw arrangement for each unit group of cylinders 15 and pistons 19 and 20 with one crankpin 17a and, spaced 180° or half a revolution therefrom, alined crankpins 18a.

The inner pistons 19 for the cylinders of each unit group are connected to the crankpin 17a by connecting rods 25. The outer pistons 20 preferably have side rods 30a of U shape with cross-heads 27a at their outer ends carried in suitable guides 28a. The inner ends of the side rods 30a are connected to side connecting rods 33 by means of side rod crosshead pins 31, the ends of the side connecting rods 33 being carried in suitable guides 32. The side connecting rods 33 for the outer pistons 20 are connected respectively to the crankpins 18a. It will thus be noted that the outer pistons 20 are connected to common alined crankpins 18a and the inner pistons 19 are connected to a common crankpin 17a.

The arrangement of the crankpins 17a and 18a is indicated in Fig. 12. The inner pistons 19 for the cylinders A and I are connected to a crankpin 17a disposed in a plane arbitrarily selected as a horizontal plane at a zero location, and the outer pistons 20 of these cylinders are connected to alined crankpins 18a at a position 180° from the zero location.

The inner pistons 19 of the cylinders B and J are connected to a crankpin 17a below the horizontal plane and at 90° with respect to the zero location, and the outer pistons 20 of these cylinders are connected to crankpins 18a positioned 180° with respect to the crankpin 17a for these cylinders or at a 270° location.

The inner pistons 19 of the cylinders C and K are connected to a crankpin 17a at a 225° location with the outer pistons for these cylinders connected to crankpins 18a positioned 180° therefrom or at a 45° location.

The inner pistons 19 of the cylinders D and L are connected to a crankpin 17a at a 135° location, with the outer pistons for these cylinders connected to crankpins 18a positioned 180° therefrom or at a 315° location.

The inner pistons 19 of the cylinders E and M are connected to a crankpin 17a at a 315° location, with the outer pistons 20 for these cylinders connected to crankpins 18a positioned 180° therefrom or at a 135° location.

The inner pistons 19 of the cylinders F and N are connected to a crankpin 17a at a 45° location, with the outer pistons for these cylinders connected to crankpins 18a positioned 180° therefrom or at a 225° location.

The inner pistons 19 of the cylinders G and O are connected to a crankpin 17a at a 270° location, with the outer pistons for these cylinders connected to crankpins 18a positioned 180° therefrom or at a 90° location.

The inner pistons 19 of the cylinders H and P are connected to a crankpin 17a at a 180° location, with the outer pistons for these cylinders connected to crankpins 18a positioned 180° therefrom or at a 0° location.

It will be noted that in each instance the inner pistons 19 of each unit group and the outer pistons 20 of each unit group function in a predetermined relationship and that a predetermined relationship exists among the unit groups. For example, when the pistons 19 and 20 in the cylinder A are in firing position the pistons 19 and 20 in the cylinder P are in firing position and at the same time the pistons 19 and 20 in the cylinders I and H are in exhaust and scavenging position.

The preferred firing order is AP, FK, BO, DM, HI, CN, GJ, and EL; and then PA, KF, OB, MD, IH, NC, JG, and LE, the two cylinders in each instance firing simultaneously.

Each of the cylinders 15 is provided at the central portion thereof with a chamber 35 which surrounds or encircles the cylinder 15 and is in communication with the interior of the cylinder 15 through inlet ports 36a spaced on either side of the center of the cylinder 15 or the inner end position of the pistons 19 and 20. The chambers 35 are provided with valves 38 which function as combustion air and scavenging air inlet valves preferably operated in the manner heretofore pointed out.

Fuel supply valves 60 preferably of the type heretofore referred to are also provided.

The cylinders 15 are provided with the exhaust ports 65 located at the outer ends of the paths of the pistons and are in communication with exhaust chambers 66 which surround or encircle each cylinder 15.

The mode of operation of the engine illustrated in Figs. 11 and 12 is similar to that of the engine illustrated in Figs. 1 to 10, inclusive. Air from any suitable source of air under pressure such, for example, as blowers (not shown) is delivered to the air supply passages 39 at the inlet side of the air control valves 38.

Commencing with the pistons 19 and 20 at the outer ends of their strokes, and with the air inlet valves 38 open, as the pistons 19 and 20 move inwardly the exhaust ports 65 at each end of the cylinder 15 are shut off by the pistons 19 and 20. The cams 45 have theretofore opened the air valves 38 so that air is introduced into the cylinder 15 through the inlet ports 36a with a rotary motion. The supply of air is shut off and as the pistons 19 and 20 continue their inward movement the air trapped in the cylinder 15 between the pistons 19 and 20 and in the air chamber 35 is compressed by the further inward movement of the pistons. As the pistons 19 and 20 approach each other air is retained in the interior space 21a and a portion of the air is forced into and retained in the chamber 35. The pistons 19 and 20, as they approach the center of the cylinder 15, cut off the inlet ports 36a. The air between the pistons 19 and 20 and in the space 21a at the final stage of compression is ready to receive the fuel which is introduced by and through the fuel inlet valve 60 in the manner heretofore pointed out. The burning of the fuel in the air in the interior space 21a provides a force tending to separate the pistons 19 and 20. As the pistons 19 and 20 separate the air from the chamber 35 enters through the ports 36a with a rotary and turbulent motion and aids in the combustion.

The expansion of the gases upon combustion provides the force for driving the pistons 19 and 20 in the usual manner. As the pistons 19 and 20 separate and approach the outer ends of their strokes the exhaust ports 65 are uncovered, permitting the discharge of the exhaust combustion products. As the exhaust ports 65 are opened by the movement of the pistons 19 and 20 the air inlet valve 38 is also opened to provide scavenging of the cylinders 15 in the manner heretofore pointed out. The pistons 19 and 20 then move inwardly as before, and the operation is repeated.

The pistons 19 and 20 in the respective cylinders A to H, inclusive, operate in predetermined timed relationship as heretofore pointed out.

By mounting the cylinders in the manner illustrated and heretofore described and by providing a timed relationship between the outer pistons 20 and the inner pistons 19 of the cylinders in each unit group and among the unit groups, a compact, strong and effective arrangement is provided. It will be noted that the connecting rods and the piston rods all are adapted to transmit forces in straight lines with a minimum of bending stresses and with reduced likelihood of injury or excessive stresses therein.

I claim:

1. A compression ignition engine comprising spaced rows of cylinders, the cylinders in each of said rows having their longitudinal axes disposed in a plane, inner and outer pistons in each of said cylinders, a crank shaft between the rows of cylinders having a plurality of crankpins, means for connecting the inner pistons for opposite cylinders to a crankpin, and means for connecting the outer pistons for said cylinders to another crankpin, said connecting means for the outer pistons including connecting rods connected to said other crank pin, side rod members connecting said connecting rods to said outer pistons, and spaced guides along which said side rod members are slidably movable.

2. A compression ignition engine comprising spaced rows of cylinders, the cylinders in one row having their longitudinal axes offset with respect to the cylinders of the other row, inner and outer pistons in each of said cylinders, a crankshaft between the rows of cylinders having a plurality of crankpins, means for connecting opposite pairs of inner pistons of opposite cylinders to a crankpin, and means for connecting outer pistons of the same cylinders to another crankpin.

3. A compression ignition engine comprising spaced rows of parallel cylinders with their longitudinal axes disposed in a plane, the cylinders in one row having their longitudinal axes offset with respect to the cylinders of the other row, inner and outer opposed pistons in each of said cylinders, a crankshaft between the rows of cylinders having a plurality of crankpins, means for connecting opposite pairs of inner pistons for opposite cylinders to a crankpin, and means for connecting outer pistons for said cylinders to another crankpin.

4. A compression ignition engine comprising spaced rows of parallel cylinders with their longitudinal axes disposed in a plane, the cylinders in one row having their longitudinal axes offset with respect to the cylinders of the other row, opposed inner and outer pistons in each of said cylinders, a crankshaft having a plurality of crankpins, the pistons adjacent the crankshaft being respectively connected in pairs to crankpins at predetermined locations and the pistons remote from said crankshaft for the same cylinders being connected in pairs to crankpins at different predetermined locations.

5. A compression ignition engine comprising spaced rows of parallel cylinders with their longitudinal axes disposed in a plane, the cylinders in one row having their longitudinal axes offset with respect to the cylinders of the other row, inner and outer opposed pistons in each of said cylinders, a crankshaft between the rows of cylinders having a plurality of crankpins, said cylinders comprising unit groups of at least two cylinders with at least one cylinder of the group in each row, and means for connecting the inner and outer pistons of a unit group respectively to crankpins located half a revolution apart.

6. In a compression ignition engine, spaced rows of cylinders with their longitudinal axes disposed in a plane, a crankshaft between the rows of cylinders and having a plurality of crankpins, two opposed pistons in each of said cylinders, and means for connecting the pistons of an opposed pair of said cylinders to said crankshaft, said means including connections from the outer pistons of said cylinders to at least one crankpin and connections from the inner pistons to at least one different crankpin, the connections from the outer pistons including connecting rods actuated by said first mentioned crank pin and slidably movable rod members rigidly connected to said outer pistons and connected to said connecting rods.

7. A compression ignition engine comprising spaced rows of cylinders, air inlet means at the central portions of each of said cylinders, fuel inlet means at the central portions of each of said cylinders, inner and outer opposed pistons in each of said cylinders, a crankshaft between the rows of cylinders, and means for connecting said outer pistons in pairs to said crankshaft and said inner pistons in pairs to said crankshaft, the means for connecting the outer pistons to the crankshaft including rod members rigidly connected to said outer pistons and connecting rods between said rod members and said crankshaft.

8. A compression ignition engine comprising spaced rows of parallel cylinders, the cylinders in one row having their longitudinal axes offset with respect to the axes of the cylinders of the other row, air and fuel inlet means at the central portions of each of said cylinders, inner and outer opposed pistons in each of said cylinders, a crankshaft between the rows of cylinders, and means for connecting said outer pistons in pairs to said crankshaft and said inner pistons in pairs to said crankshaft.

9. A compression ignition engine comprising spaced rows of cylinders having their longitudinal axes disposed in a plane, air and fuel inlet means at the central portions of each of said cylinders, inner and outer opposed pistons in each of said cylinders, said cylinders each having exhaust ports at the outer end portions of the stroke of said pistons, a crankshaft between the rows of cylinders, and means for connecting said outer pistons in pairs to said crankshaft and said inner pistons in pairs to said crankshaft, the means for connecting the outer pistons to the crankshaft including rod members rigidly connected to said outer pistons, guides in parallel relationship to said cylinders along which said rod members are slidable, and connecting rods connecting said rod members to said crankshaft.

10. A compression ignition engine comprising spaced rows of cylinders having their longitudinal axes disposed in a plane, air inlet means at the central portions of each of said cylinders, fuel inlet means at the central portions of each of said cylinders, inner and outer opposed pistons in each of said cylinders, said cylinders each having exhaust ports spaced from said air inlet means and said fuel inlet means at the outer end portions of the stroke of said pistons, a crankshaft between the rows of cylinders, and means for connecting said outer pistons in pairs to said crankshaft and said inner pistons in pairs to said crankshaft, the means for connecting the outer pistons to the crankshaft including rod members rigidly connected to said outer pistons and disposed in the plane of the cylinders, guides in parallel relationship to the longitudinal axes of said cylinders and along which said rod members are slidable, and connecting rods connecting said rod members to said crankshaft.

11. A compression ignition engine comprising spaced rows of parallel cylinders having their longitudinal axes disposed in a plane, the cylinders in one row having their longitudinal axes offset with respect to the axes of the cylinders of the other row, air inlet means at the central portions of each of said cylinders, fuel inlet means at the central portions of each of said cylinders, inner and outer opposed pistons in each of said cylinders, said cylinders each having exhaust ports spaced longitudinally from said air inlet means and said fuel inlet means at the outer end portions of the stroke of said pistons, a crankshaft between the rows of cylinders, and means for connecting said outer pistons in pairs to said crankshaft and said inner pistons in pairs to said crankshaft.

12. In a compression ignition engine, the combination of a crankshaft having at least three crankpins, spaced cylinders on opposite sides of said crankshaft and disposed with their longitudinal axes coplanar and with the axis of one cylinder offset with respect to the axis of another cylinder, air inlet means at the central portion of each of said cylinders, fuel inlet means at the central portion of each of said cylinders, a pair of inner and outer opposed pistons in each of said cylinders, connecting means from corresponding pistons of opposite cylinders to one of said crankpins, and connecting means from the other pistons of the same cylinders to the others of said crankpins.

13. In a compression ignition engine, the combination of a crankshaft having at least three crankpins, spaced cylinders on opposite sides of said crankshaft and disposed with their longitudinal axes coplanar and with the axis of one cylinder offset with respect to the axis of another cylinder, air inlet means at the central portion of each of said cylinders, fuel inlet means at the central portion of each of said cylinders, a pair of inner and outer opposed pistons in each of said cylinders, connecting means from corresponding pistons of opposite cylinders to one of said crankpins, and connecting means from the other pistons of the same cylinders to the others of said crankpins.

14. In a compression ignition engine, the combination of a crankshaft having at least three crankpins, two of which are in alinement, spaced cylinders on opposite sides of said crankshaft and disposed with their longitudinal axes coplanar and with the axis of one cylinder offset with respect to the axis of another cylinder, air inlet means at the central portion of each of said cylinders, fuel inlet means at the central portion of each of said cylinders, a pair of inner and outer opposed pistons in each of said cylinders, exhaust ports in said cylinders spaced outwardly from said air inlet and fuel inlet means, connecting means from corresponding pistons of a pair of opposed cylinders to one of said crankpins, and connecting means from the other pistons of the same cylinders to the alined crankpins.

15. In a compression ignition engine, the combination of a crankshaft, unit groups of cylinders including at least one cylinder on each side of said crankshaft, said cylinders being disposed with their longitudinal axes coplanar and with the axes of one row offset with respect to the axes of the other row, air inlet means at the central portions of each of said cylinders, fuel inlet means at the central portions of each of said cylinders, a pair of inner and outer opposed pistons in each of said cylinders, said crankshaft having at least three crankpins for each unit group of cylinders, two of said crankpins being in alinement, and means for connecting the pistons of the unit groups to said crankshaft including connections from corresponding pistons of a pair of opposed cylinders to one of said crankpins, and connections from the other pistons of the same cylinders to said alined crankpins.

WILLIAM L. WUEHR.